OVER-THE-HORIZON RADIO SYSTEM HAVING AUTOMATIC FREQUENCY SHIFT AT PREDETERMINED SIGNAL-NOISE RATIOS

Filed March 20, 1957 2 Sheets-Sheet 1

United States Patent Office 3,001,064

Patented Sept. 19, 1961

3,001,064

OVER-THE-HORIZON RADIO SYSTEM HAVING AUTOMATIC FREQUENCY SHIFT AT PREDETERMINED SIGNAL-NOISE RATIOS

Roger Alexis and Jean Claude Simon, Paris, France, assignors to Compagnie Generale de Telegraphie Sans Fil, a corporation of France Filed Mar. 20, 1957, Ser. No. 647,333

Claims priority, application France Apr. 9, 1956

2 Claims. (Cl. 250—6)

The present invention relates to radio communication systems and, more particularly, to ultra high frequency radio links over great distances.

It is known that ultra high frequency waves, for instance of a frequency higher than 40 mc./s., can be used to establish regular radio links over distances substantially greater than those corresponding to the optical range, or line of sight propagation, and which may be as large as 300 to 400 km.

However, it has been noticed that, for a given frequency and a given link, the received signal is liable to undergo rapid fluctuations. A frequency, which at a given instant has a satisfactory signal-to-noise ratio, might, only one tenth of a second later, have a signal-to-noise ratio much lower than an acceptable one, while the reverse may be true for another, very close frequency. One has thus been led, with a view to maintaining regular radio communication links, to resort to diversity systems and, in particular, to frequency diversity systems, i.e. to the use of a plurality of transmitter and receiver chains respectively operating on different frequencies. In this way there is a fair chance that, at each instant, at least one of the transmitted frequencies might afford satisfactory communication. However, such systems are, of course, rather expensive.

It is an object of the present invention to provide an ultra high frequency long range communication system of a more economical design than has been heretofore realized.

A radio communication system according to the invention comprises in combination a transmitter, a receiver and means responsive to the signal-to-noise ratio at the receiver for controlling the transmitter signal frequency. The transmitter is preferably electronically tunable and capable of operating over a wide frequency band. It comprises conveniently a "Carcinotron" oscillator, "Carcinotron" being a registered trademark.

Means are provided for measuring the signal-to-noise ratio at the reception end and for transmitting to the transmitter information as to this ratio when the same is lower than desired. This information is used to control the carrier frequency of the transmitter in accordance with a predetermined law. Preferably, means are also provided at the receiver for tying its frequency to the transmitter frequency. To this end, the local oscillator of the receiver is advantageously also a "Carcinotron" oscillator, means being provided to apply to the control electrode thereof a direct voltage which is a function of the incoming signal level.

According to a preferred embodiment of the invention an auxiliary transmitter, having a fixed frequency which is much lower than the frequency band of the link and is capable of being continually received, is associated with the receiver and an auxiliary receiver, tuned to said fixed frequency, is associated with said transmitter.

The operation of the auxiliary transmitter is initiated as soon as the signal-to-noise ratio is lower than a predetermined acceptable value and is blocked as soon as this ratio has again reached this value. The information thus transmitted and collected by the auxiliary receiver is used for continuously varying the carrier frequency of the radio link transmitter, the frequency band of this transmitter being thus scanned as long as the auxiliary transmitter operates. As soon as the latter stops its operation, which occurs when the signal-to-noise ratio at the receiver becomes satisfactory, the radio link transmitter continues transmitting on the frequency which it has at the moment at which the auxiliary transmitter terminated its transmission.

The invention may be applied, in particular, to the transmission of television signals at long distances.

The invention will be better understood and further details thereof will become apparent from the following detailed description.

In the drawing which shows, by way of example, one preferred embodiment of the invention:

FIG. 1 shows a block diagram of a system according to the invention;

FIG. 2 very diagrammatically shows a transmitter which may be used in a system according to the invention;

Figure 1:
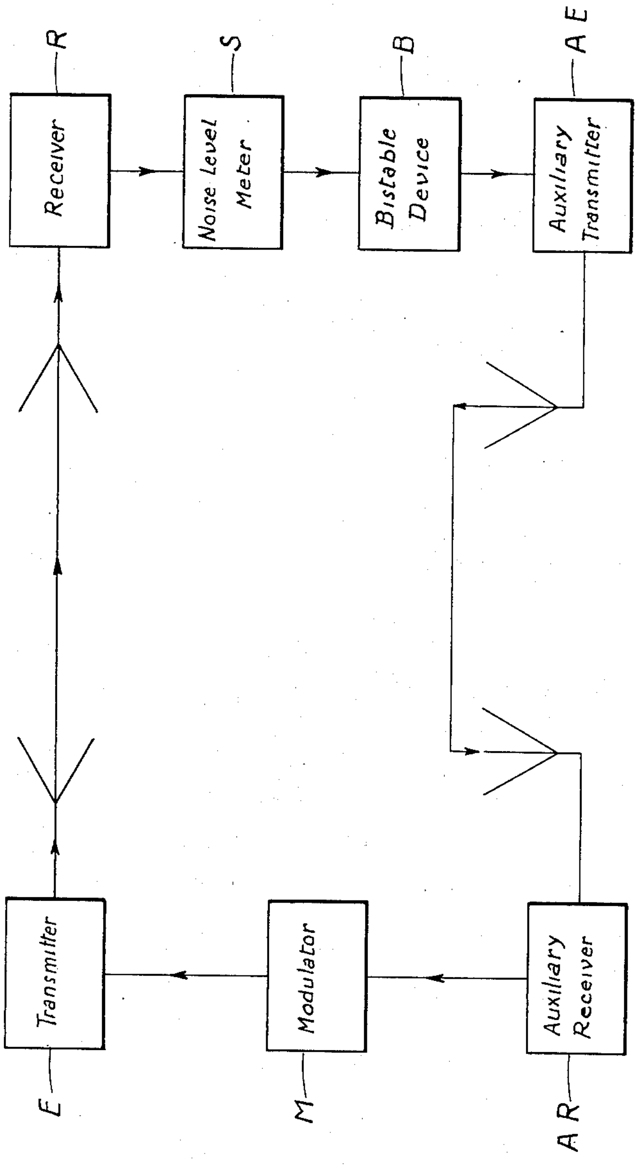

According to the embodiment shown in FIG. 1, a receiver R which constitutes a radio link with a transmitter E controls, through the medium of a threshold trigger device S, a bistable device B, such as a multivibrator or flip-flop of known type. When set in its active state, this latter device initiates the operation of an auxiliary transmitter AE, centered on a fixed frequency $f$ in the range of, for example, 1 to 10 mc./s.

Transmitter E, which comprises preferably a broad electronically tunable oscillator, is controlled by a modulator or frequency regulator M, adapted to vary the transmission frequency thereof. The operation of this tuning device is started or stopped by an auxiliary receiver AR tuned to frequency $f$.

Device S which may be of any known type is adapted to measure the signal-to-noise ratio at the receiver R, and to trip bistable device B into its active state each time the above ratio reaches a value lower than a predetermined threshold. This starts the transmission by transmitter AE of a signal which is received by receiver AR. This receiver sets in action frequency regulator M to vary progressively the frequency of transmitter E. As soon as this latter transmits on a frequency for which the signal-to-noise ratio is higher than the predetermined threshold value, trigger device S trips device B into its inactive condition; transmitter AE ceases to transmit and modulator M ceases to operate, while transmitter E continues to transmit on the frequency on which it was transmitting at the moment transmitter AE stopped transmitting.

Figures 2, 3, 4, 5:
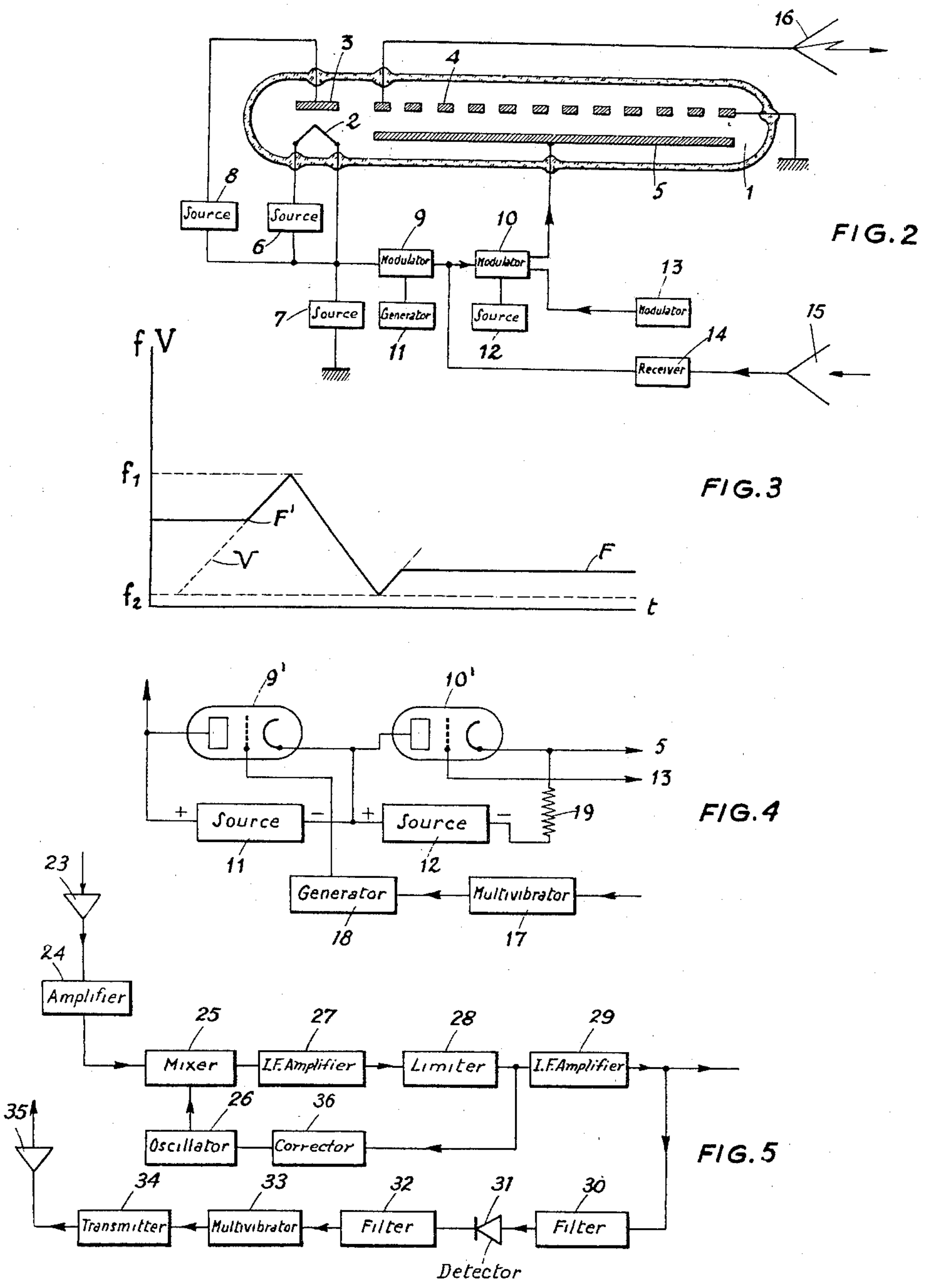
FIG. 3 is an explanatory curve relating to the operation of the transmitter illustrated in FIG. 2.
FIG. 4 shows a detail of the transmitter represented in FIG. 2.
FIG. 5 shows a block diagram of a receiver which may be used in a system according to the invention.

FIG. 2 shows an embodiment of a transmitter E which may be used in the system according to the invention. This transmitter comprises a "Carcinotron" oscillator 1, which may be of the magnetron type, i.e. of the type having crossed electric and magnetic fields. Oscillator 1 comprises a cathode 2, an anode 3, a delay line 4 which may be grounded and a negative electrode, or sole 5. This tube, although relatively recent, is by now familiar to those skilled in the art and accordingly need not be described with more detail. It is well known that the frequency of such a tube is a linear function of the potential difference between the sole and the delay line. The cathode is heated and brought to a high negative potential with respect to delay line 4 by a supply source 6. A supply source 8 raises anode 3 to a suitable positive potential with respect to cathode 2. A frequency regulator or modulator 9, comprising a source 11, is connected to vary the potential difference between the sole 5 and the delay line 4. In the embodiment shown, a modulator 10, comprising a source 12, receives a video signal from a video chain or modulator 13 to modulate the output of oscillator 1 which is radiated by an antenna 16. An auxiliary receiver 14, having an aerial 15, is adapted to set into action modulator 9 when receiving signals from auxiliary transmitter AE described above.

The operation of the transmitter of FIG. 2 is as follows:

The potential difference between sole 5 and delay line 34 varies with the video signals incoming from video chain 13 and the output of tube 1 is modulated accordingly in the usual way. In addition to that, when a signal is picked up by aerial 15, receiver 14 starts frequency modulator 9 through any means known per se. The potential between sole 5 and delay line 4 is then varied, thus causing the transmission frequency of oscillator 1 to vary in a continuous way within the frequency band of this tube according to a predetermined law. This variation stops as soon as aerial 15 receives no more signals.

FIG. 4 shows how modulators 9 and 10 may be arranged.

These modulators comprise respectively two tubes 9′ and 10′, the anodes of which are connected to the positive poles of supply sources 11 and 12, respectively.

The cathode of modulator tube 9′ is connected to the negative pole of source 11 and the cathode of modulator tube 10′ to the negative pole of source 12 through a resistance 19. Sources 11 and 12 are connected in series.

The incoming signal from chain 13 is applied to the grid of tube 10′. The grid of tube 9′ is connected to an isosceles triangle wave generator 18 which may be started and stopped by means of a bistable multivibrator 17, which is in its conductive or non-conductive state according as it is receiving a signal or not from aerial 15.

The operation of this system is readily understood. The signal coming from chain 13 causes the internal resistance of tube 10 to vary, thus varying the potential difference between sole 5 and cathode 2 or the potential difference between sole 5 and the grounded delay line 4, thereby frequency modulating the output of "Carcinotron" oscillator 1.

Likewise, when generator 18 operates, the carrier frequency of tube 1 follows the time variation of the isosceles triangle voltage V supplied by generator 18 as shown in FIG. 3. This occurs when multivibrator 17 has been tripped into its active state by a signal received from transmitter AE and has started generator 18. As soon as the signal is no longer received, multivibrator 17 is tripped into its inactive position, thus stopping generator 18. If at that time the carrier frequency of oscillator 1 is F (FIG. 3), the transmitter goes on transmitting on that frequency. Thus the transmitter frequency is always comprised between two fixed limit values $f_1$ and $f_2$, respectively corresponding to the highest and the lowest voltage output of generator 18. As shown in FIG 3, the scanning of the frequency interval, comprised between these limits, starts with reception of a signal from the transmitter AE, at the instant when the transmitter frequency is F′ and stops at a value F, both comprised between $f_1$ and $f_2$, when this signal is no longer received. The duration of one cycle of this variation may be of the order of one hundredth of a second and of course both modulations are cumulative. Modulator 10 supplies, for instance, television signals within a frequency band of about 10 mc./s. Modulator 9 yields a slow modulation and may cause the frequency of the Carcinotron tube to vary from 3,500 to 3,700 mc./s., for instance.

FIG. 5 diagrammatically illustrates an embodiment of the receiver which may be used in the system according to the invention.

This receiver comprises an aerial 23 feeding a wide-band ultra high frequency amplifier 24, for instance a traveling wave amplifier. The output of this tube is connected to a mixer 25 which also receives energy from a wide-band electronically-tuned local oscillator 26, for instance a "Carcinotron" oscillator. This mixer is followed by an intermediate frequency amplifier 27, a limiter 28 and a video amplifier 29. This amplifier feeds the conventional receiver stages (not shown) and, on the other hand, a high pass filter 30 which eliminates the frequency band of the receiver signals.

The output of this filter is connected to a detector 31, whose output is filtered by filter 32 in the usual way to control a bistable multivibrator 33. When set into a first state, this multivibrator starts an auxiliary transmitter 34, having an aerial 35, to stop transmitter 34 when tripped into its inactive state. The operation of such multivibrators is well known in the art.

The output from limiter 28 also feeds a device 36 supplying a voltage, which is a function of the peak voltage of the signal at the output of said limiter 28. This voltage is adapted to modulate the local oscillator 26.

The receiver of FIG. 5 operates as follows:

The pass-band filter 30, whose cut-off frequency is the highest frequency of the signal spectrum, allows only the passage of the noise frequencies higher than the signal frequencies and this gives the average noise level. Since the level at the output of amplifier 29 is constant, the direct voltage, collected at the output of detector 31 and filter 32, may be taken as a measure of the average signal-to-noise ratio at the receiver. When this voltage exceeds a certain threshold, it trips the multivibrator 33 from is inactive into its active state, thus starting the auxiliary transmitter 34. The latter radiates by means of an aerial 35 a signal which is received by aerial 15 of the auxiliary receiver 14, trips multivibrator 17 and starts the frequency excursion of oscillator 1.

As to the output signal of amplifier 28, it drops as soon as the frequency of transmitter 1 changes, since the signal incoming to this amplifier from the mixer 27, no longer has the frequency to which limiter 28 is tuned. The corrector device 36 supplies in this case a modulating voltage to oscillator 26 thus changing the frequency thereof. The resulting frequency of mixer 27 is thus again the frequency of limiter 28. A feedback loop is thus established to tie the frequency of oscillator 26 to the frequency of the transmitter 1 at all times.

Experience has shown that a given frequency may usually not be used during more than one tenth of a second in a link of the type considered: consequently, the search time for a suitable frequency, i.e. the cycle of generator 11, must not exceed one hundredth of a second.

It is to be understood that the embodiment described has been given only by way of example. Many variations could be made thereto without departing from the spirit and scope of the invention. For instance, generator 18 may produce a periodic voltage of any other shape than the one mentioned above.

What we claim is:

1. An ultra high frequency communication system comprising a broad band electronically tunable transmitter; a modulator generator for said transmitter for providing a modulating voltage of a predetermined recurrent wave form; an auxiliary receiver associated with said transmitter and having means for actuating said generator upon reception of a signal of a predetermined frequency; a receiver for receiving signals from said broad band transmitter, said receiver comprising a limiter for limiting the amplitude of the received signal to a predetermined level, means for filtering noise frequencies outside the frequency band of said signals and means for measuring the level of said noise; an auxiliary transmitter associated with said receiver for transmitting a signal having said predetermined frequency and means for initiating transmission by said auxiliary transmitter upon said noise level reaching a predetermined value and for causing said auxiliary transmitter to stop transmission upon said level becoming lower than said value.

2. An ultra high frequency long distance communication system comprising a broad band electronically tunable transmitter; a modulator generator for said transmitter for providing a modulating voltage of a predetermined recurrent wave form; an auxiliary receiver associated with said transmitter and having means for actuating said generator upon reception of a signal having a predetermined frequency; a receiver for receiving signals from said broad band transmitter, said receiver comprising a broad band amplifier, a mixer having an input coupled to said amplifier, another input and an output for providing a beat frequency, a limiter for limiting the amplitude of the received signals to a predetermined level, means for filtering noise frequencies outside the frequency band of said signals and means for measuring the level of said noise; an auxiliary transmitter having said predetermined frequency, associated with said receiver; means for initiating transmission by said auxiliary transmitter upon said noise level reaching a predetermined value and stopping said auxiliary transmitter upon said level becoming lower than said value; a local broad band tunable oscillator coupled to said other mixer input; and a modulator for providing a correcting tuning voltage for said local oscillator for keeping constant said mixer beat frequency.

References Cited in the file of this patent

UNITED STATES PATENTS

| | | |
|---|---|---|
| 2,379,069 | Dysart | June 26, 1945 |
| 2,435,010 | Knapp et al. | Jan. 27, 1948 |
| 2,521,696 | De Armond | Sept. 12, 1950 |
| 2,686,256 | Albersheim | Aug. 10, 1954 |
| 2,694,140 | Gilman et al. | Nov. 9, 1954 |
| 2,773,176 | Braak et al. | Dec. 4, 1956 |

FOREIGN PATENTS

| | | |
|---|---|---|
| 811,767 | France | Jan. 23, 1937 |